United States Patent [19]

Harlow

[11] 4,341,509
[45] Jul. 27, 1982

[54] CROSSHEAD EXTRUSION DIE

[75] Inventor: Norman R. Harlow, Cornwall-on-the-Hudson, N.Y.

[73] Assignee: Carlisle Corporation, Buchanan, N.Y.

[21] Appl. No.: 46,927

[22] Filed: Jun. 8, 1979

[51] Int. Cl.³ .............................................. B29F 3/10
[52] U.S. Cl. .................................... 425/114; 264/174; 425/190; 425/376 A; 425/376 R; 425/461; 425/467
[58] Field of Search ............... 425/114, 376 A, 376 R, 425/190, 192, 461, 467; 264/174, 172

[56] References Cited

U.S. PATENT DOCUMENTS

| | | | |
|---|---|---|---|
| 3,252,183 | 5/1966 | Bronzert | 425/114 |
| 3,382,535 | 5/1968 | Ferrari | 425/461 |
| 3,383,736 | 5/1968 | Brandt | 425/114 |
| 3,480,998 | 12/1969 | Erdberg | 425/376 A |
| 3,758,247 | 9/1973 | Deegen | 425/114 |
| 3,797,987 | 3/1974 | Marion | 425/463 |
| 3,815,637 | 6/1974 | Carrow | 138/45 |
| 3,884,611 | 5/1975 | Anderson et al. | 425/376 R |
| 3,941,551 | 3/1976 | Marion | 425/463 |
| 4,165,957 | 8/1979 | Kertscher | 264/174 |

Primary Examiner—Jeffery R. Thurlow
Attorney, Agent, or Firm—Brooks, Haidt, Haffner & Delahunty

[57] ABSTRACT

A die assembly for extruding a cover of a thermoplastic material over on plurality of bare or previously covered wires. The assembly comprises a two-part die body which holds between the parts a pair of removable cylindrical distributors, a removable wire guide and a removable die plate. The distributors are spaced from each other and the wire guide and the die plate are on opposite sides of the space between the distributors. Manifolds in the body parts supply heated thermoplastic material to flow channels on the peripheries of the distributors, and such channels extend to the space between the distributors. The wire guide has tubular passageways equal in number to the number of wires to be covered, and the die plate has an opening or openings dimensioned to correspond to the exterior dimensions of the cover or covers to be applied to the wires.

8 Claims, 10 Drawing Figures

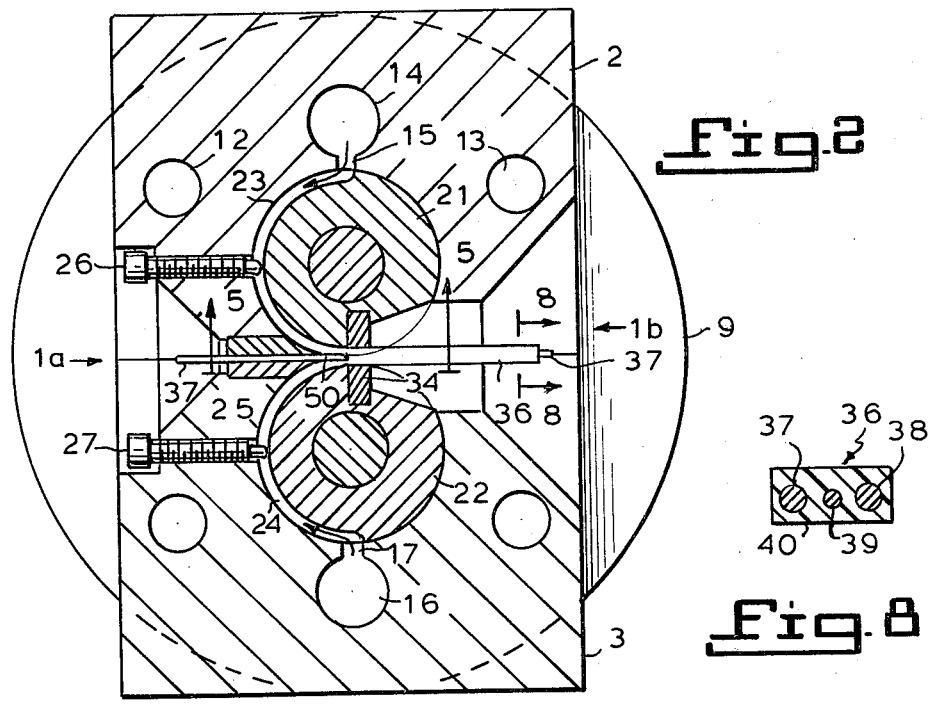

CROSSHEAD EXTRUSION DIE

The invention relates to a die for the extrusion of plastic materials as insulating coverings for electrical conductors and particularly, to such a die which permits the simultaneous covering of a plurality of parallel, coplanar conductors with such materials.

The covering of electrical conductors by extruding thermoplastic insulating material over the conductors as they are pulled through an extrusion die is well known in the art, and many different types of dies for the extrusion of thermoplastic materials are known in the art. See, for example, U.S. Pat. Nos. 3,797,987; 3,815,637; 3,884,611; and 3,941,551.

An extruder can have a relatively large capacity, and when relatively fine conductors or wires are being provided with relatively thin coverings of a thermoplastic material, the capacity of the extruder to supply the thermoplastic material to the extrusion die can be more than ample for the covering of a single or only a few wires. Thus, an extrusion die which can simultaneously cover a large number or several sets of wires is desirable.

In addition, to maintain uniform spacing between several coplanar wires, it is desirable to provide wire guides which extend as close as possible to the die exit and for this reason, as well as to minimize unnecessary heating of the wires, it is desirable to keep very short the distance between the points at which the wires encounter the heated thermoplastic material to the point at which the covered wires exit from the die. When such distance is short and the die is open shortly in advance of the points where the wire encounters the thermoplastic material, threading of the wires through the die, either initially or when wires break, is simplified and the flow of thermoplastic material has less chance to distort the wire. Of course, a die which will accomplish these purposes should be simple in construction.

It is also desirable with a die which can simultaneously cover several wires that it not be restricted to providing the same thickness of covering to all wires and that the die be easily modified to accomodate different wires or different thicknesses of covering either for different runs or the same run. Thus, with such a die, several different cables can be produced at the same time or the die can be modified easily for successive runs of different cables.

One object of the invention is to provide an extrusion die having the features indicated hereinbefore to be desirable.

In accordance with the preferred embodiment of the invention, an electrically heated die body contains a pair of removable distribution cylinders each having a single or a plurality of peripherally extending grooves, i.e., flow channels spaced from each other in a direction transverse to the direction of movement of the wires to be covered during passage through the die. The input ends of the channels are at one peripheral portion of a cylinder, and the channels extend to adjacent the exit end of a replaceable wire guide. Thermoplastic material is supplied to the input ends of the channels through passageways or manifolds in the die body. There is a flow adjusting screw for each channel in the die body. Where there is only one channel in each die body, or where the channels are wide, a plurality of flow adjusting screws can be used for each channel. There is a replaceable die plate, with openings for the passage of the covered wires, immediately downstream of the exit end of the wire guide so that there is only a short distance between the exit end of the wire guide, where the heated thermoplastic material contacts the wires, and the exit or downstream side of the die plate.

Other objects and advantages of the present invention will be apparent from the following detailed description of the presently preferred embodiments thereof, which description should be considered in conjunction with the accompanying drawings in which:

FIG. 2 is a cross-sectional, side elevation view of the embodiment shown in FIG. 1;

FIG. 3 is an end elevation view, partly in cross-section, of the exit end of the embodiment shown in FIG. 1;

FIG. 8 is a cross-sectional view of one of the covered wire cables which may be produced with the die assembly shown in the preceeding Figures;

Figure 1:
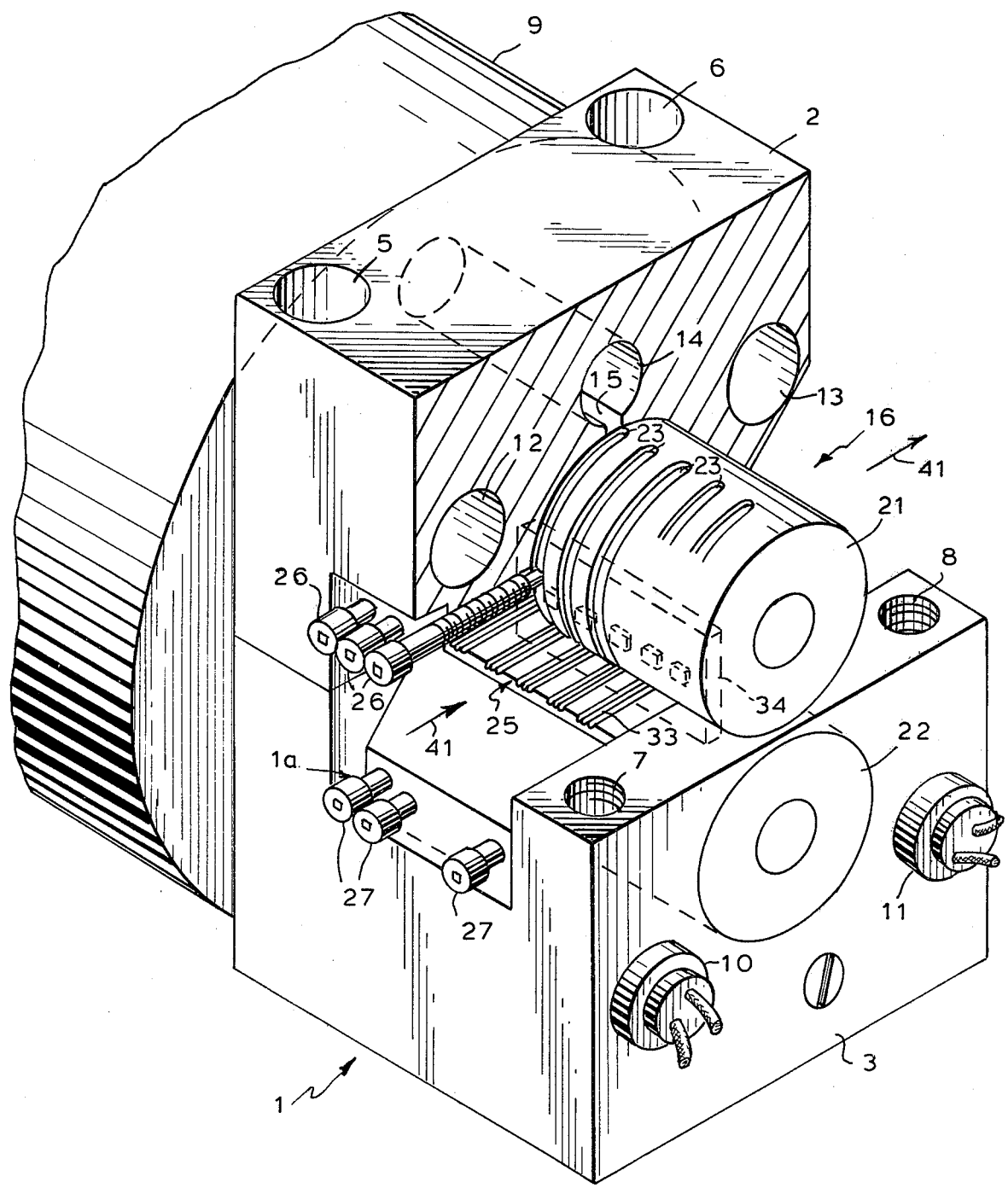
FIG. 1 is an isometric view, partly in section, of the die assembly of the invention secured to an adapter for connecting the assembly to an extruder nozzle.

FIG. 1 illustrates a die body 1, made up of two parts, an upper part 2 and a lower part 3, which may be held in assembled relation by bolts (not shown) extending through four similarly located holes in the upper part 2, only two of which, 5 and 6, are shown on FIG. 1, and engaging the threads of corresponding holes, such as the threaded holes 7 and 8, in the lower part 3. The die body 1 has an inlet opening 1a and an outlet opening 1b. The body 1 is secured, in any conventional manner, to an adapter 9 for purposes hereinafter described, and the die parts 2 and 3 are heated by conventional, electrically energized, cartridge heaters, two of which, 10 and 11, being shown in FIG. 1 and others, not shown, being received in the bores 12 and 13.

The part 2 has a manifold 14 with a slot 15 in the sidewall thereof, and the part 3 has a similar manifold 16 with a slot 17 in the sidewall thereof. Thermoplastic material is fed to the manifolds 14 and 16 by way, respectively, of passageways 18 and 19 (FIG. 3) in the adapter 9 which connect with an opening 20 for receiving a nozzle of an extruder.

A pair of cylindrical flow distributors or flow channel means 21 and 22 are received, and secured in position, in the die parts 2 and 3 respectively. The distributors 21 and 22 are held in position by pressure applied thereto by the parts 2 and 3 when the bolts, such as the bolts in the holes 5 and 6, are tightened. Each distributor has a plurality of spaced flow channels 23 and 24 extending from the corresponding manifold 14 and 16 to adjacent the exit end of a wire guide 25. The distributors 21 and 22 are spaced apart so as to provide a space 50 for receiving the thermoplastic material and contacting it with the wires to be covered. The channels 23 and 24 are spaced apart in a direction perpendicular to the direction of movement of wires to be covered through the die body 1, and flow adjusting screws 26, having points which extend into the channels 23, permit individual adjustment of the flow of thermoplastic material through the channels 23. Similar flow adjusting screws 27 permit adjustment of the flow of thermoplastic material through the channels 24.

Figures 5, 6:
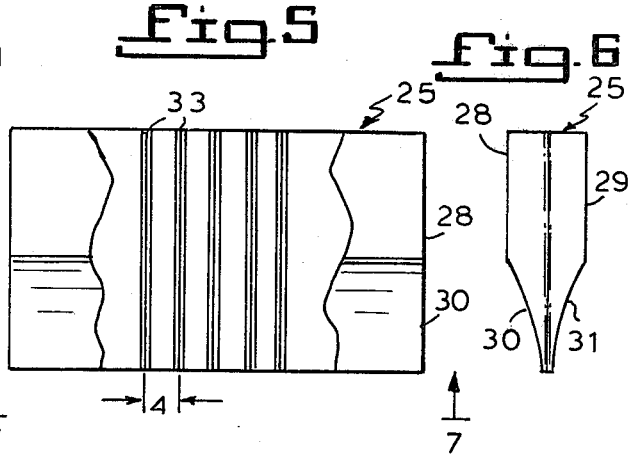
FIGS. 5 and 6 are, respectively, a partly broken away plan view and a side view of the wire guide employed in the embodiment shown in FIG. 1, FIG. 5 being taken along the line 5—5 indicated in FIG. 2.
Figure 7:
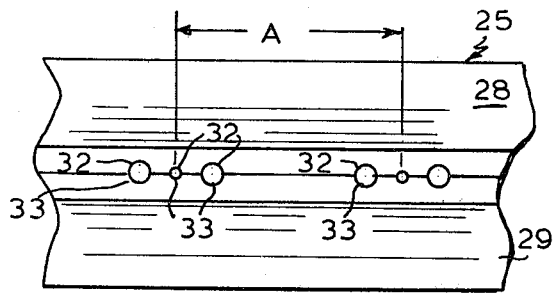
FIG. 7 is a fragmentary enlarged, end view of the wire guide shown in FIGS. 5 and 6.

The wire guide 25 comprises two abutting and separable parts 28 and 29 (FIGS. 5–7) which have faces 30 and 31 shaped to mate with and about the peripheries of the distributors 21 and 22 (see FIG. 2). At their abutting surfaces, the guide parts 28 and 29 have matching grooves 32 and 33 which are shaped to receive, with a sliding fit, and guide wires, either bare or previously covered, which are to be covered with the thermoplastic material. The matching grooves 32 and 33 form tubular passageways which prevent contact of the hot, thermoplastic material with the wires until they enter the space 50.

Figure 4:
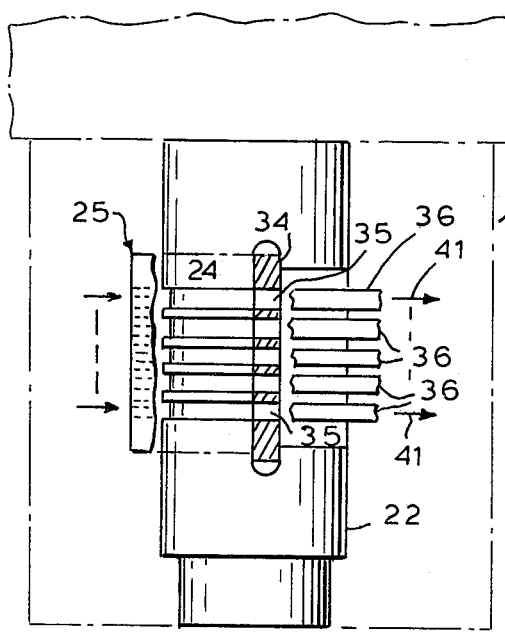
FIG. 4 is a fragmentary, plan view of the embodiment shown in FIG. 1.

A die plate 34 is disposed immediately adjacent, but spaced, from, the exit end of the wire guide 25 (FIGS. 1, 2 and 4). The plate 34 is received and held in slots or grooves in the distributors 21 and 22. The plate 34 has a number of openings 35 equal to the number of cables being processed, and the dimensions of the openings 35 correspond to the desired outer dimensions of the covering on the wires or cable. The openings 35 are respectively aligned, in the direction of movement of the wires, with the grooves 32 and 33. The channels overlie the grooves 32 and 33, and the channels 24 underlie the grooves 32 and 33. The channels 23 and 24 extend to the space 50 between the exit end of the wire guide 25 and the die plate 34 so that thermoplastic from the channels 23 and 24 intermingles in such space 50. However, the length of such space, between the exit end of the wire guide 25 and the die plate 34, is relatively small, e.g., one-eighth inch or less, so that the wires being covered are exposed to the hot thermoplastic material for only a short period of time.

FIG. 8 illustrates one of several cables 36 which may be simultaneously or individually manufactured with the die assembly of the invention described hereinbefore. The cable 36 comprises two wires 37 and 38 of approximately the same diameter on opposite sides of a wire 39 of smaller diameter, the wires 37–39 being provided with a covering 40 of thermoplastic material. The wire 39 is received in the center pair of grooves 32 and 33 and the wires 37 and 38 are received, respectively, in the left and right pairs of grooves 32 and 33 shown at the left portion of FIG. 7. At startup, the wires 37–39 are fed into the appropriate grooves 32 and 33 and fed through the openings 35 aligned therewith. The free ends of the wires 37–39 at the exit or downstream side of the plate 34 are then secured to conventional wire pulling apparatus which is activated when thermoplastic material is supplied to the manifolds 14 and 16 by an extruder. The wires move in the direction of the arrows 41.

The cable 38 is merely illustrative of one type of cable which may be produced with the die assembly of the invention. The wires 37–39 may be all of the same diameter and/or there may be a greater or lesser number of wires, several cables may be simultaneously produced, or by stopping material flow in the appropriate channels 23 and 24 not used, by means of the adjusting screw 26 and 27, a single cable may be produced. Alternatively, different distributors 21 and 22 having a number of channels 23 and 24 corresponding to the number of cables being produced may be substituted for distributors 21 and 22 shown in the drawing. Of course, in each embodiment, the channels 23 and 24, preferably, will have a width, in the direction axially of the distributors 21 and 22, substantially equal to the width of the cable to which the channels supply thermoplastic materials, e.g. the width of the channels 23 and 24 which are shown in the drawings and which supply thermoplastic material for the covering 40 is substantially equal to the width of the cable 38. However, as described hereinafter, it is also possible to use the same distributors 21 and 22 with flow channels 23 and 24 which have a width different from that of the cable for covering the wires, the widths of the cable covering being determined by the widths of the openings 35 in the plate 34.

It will be observed that the die assembly of the invention may be easily modified to permit the covering of different sizes and numbers of wires by separating the die parts 2 and 3 and replacing the wire guide 25 and the plate 34 by a different wire guide 25 and a different plate 34. If necessary, the distributors 21 and 22 may also be replaced by distributors having flow channels 23 and 24 which are different in number, spacing and or width. The die assembly is particularly advantageous for the manufacture of cables which are relatively thin and wide.

It will also be observed that with the die assembly of the invention, the wires are guided by the wire guide 25 substantially until they reach the plate 34. Thus, the space 50 between the guide 25 and the plate 34, where the heated thermoplastic material first encounters the wires, is relatively small and the dimension of the plate 34 in the direction of movement of the wires is relatively small. Since the thermoplastic material cools rapidly after leaving the plate 34, and cools while it is moving through the plate 34, the wires are subjected to the relatively high temperatures of the fed thermoplastic material for only a very short time. Accordingly, the wires are maintained in properly spaced positions up until the last possible moment, and the heating of the wires is kept to a minimum. Also, because of the construction of the die assembly of the invention the input or entrance side of the wire guide 25 is readily accessible, and the distance from such entrance side to the exit side of the plate 34 is relatively short so that initial threading of wires, or threading or wires to replace broken wires, may be easily accomplished.

An unexpected advantage of the die assembly of the invention is that if the wires have been previously covered with a thermoplastic insulating material which would normally adhere to the type of covering material supplied by such die assembly with sufficient heating, the heating of the previously so-covered wires during their passage through the die assembly may be arranged to be of such a magnitude that the covering applied by the die assembly does not adhere to the previous covering of the wires. Thus, it is possible to cover previously covered wires with a jacket of thermoplastic material which is readily strippable without damaging the primary insulation of the wires.

Figure 9:
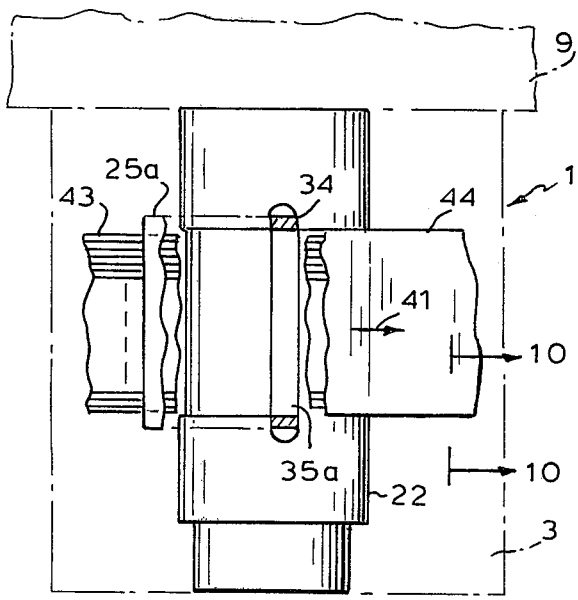
FIG. 9 is a plan view similar to FIG. 4 of a modification of the embodiment shown in FIGS. 1-8.
Figure 10:
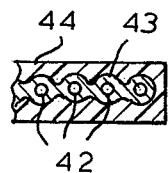
FIG. 10 is a cross-sectional view of a cable which may be produced with the modified die assembly shown in FIG. 9.

FIG. 10 illustrates a plurality of wires 42 which have been covered with a thermoplastic insulating material 43 prior to passing through a die assembly of the invention and which have been covered with a jacket 44 of thermoplastic material. Normally, with sufficient heating, the jacket 44 would be thermally sealed to the insulating material 43, but with a modified die assembly of the type illustrated in FIG. 9, the jacket 44 may be properly extruded over the wires 42 covered by the material 43 without causing the jacket 44 to be sealed to the material 43.

In the embodiment shown in FIG. 9, the wires 42 covered by the material 43 are fed through a wire guide 25a, which may have grooves like the grooves in the guide 25 to receive the covered wires 42, and pass through a die plate 34a having a single opening 35a with dimensions corresponding substantially to the outside dimensions of the jacket 44. The heating of the die parts 2 and 3 is such that the thermoplastic material for the jacket 44 properly flows through the die assembly and covers the insulations 43 but is maintained low enough so that the jacket 44 does not heat seal to the material 43. This is readily possible because of the short time of contact of the material 43 with material of the jacket 44 which is heated to a temperature necessary for proper flow thereof. Of course, if desired, the temperature of the die assembly may also be higher so that the jacket 44 will heat to the insulating material 43.

In the embodiment shown in FIG. 9, the distributors 21 and 22 may have a plurality of spaced channels 23 and 24 as in the previous embodiment or each may have a single channel having a width substantially equal to the width dimension of the jacket 44. In the latter event, each channel requires a plurality of adjusting screws 26 and 27 spaced at short intervals across the width of the channel in order to permit adequate control of the flow of the material of the jacket 44.

It will be apparent that the die assembly of the invention is simple in construction and is readily adaptable to different uses. Conductor or wire alignment is maintained up until the wires are close to the die exit, and there is a relatively short distance between the points at which the wires enter the die assembly to the point at which the cable exits from the assembly. Flow of the thermoplastic covering material is relatively adjustable, and several cables can be simultaneously formed with the same or different covering thicknesses. The same die assembly can be used for the covering of bare wires or previously covered wires, and when further coverings are applied over previously covered wires, the second and/or subsequent coverings may be either heat sealed, or not heat sealed, to the underlying covering.

Although preferred embodiments of the present invention have been described and illustrated, it will be apparent to those skilled in the art that various modifications may be made without departing from the principles of the invention.

I claim:

1. A die assembly for the extrusion of a covering of a thermoextrudable material over a plurality of bare or covered wires, said assembly comprising:
   a two-part die body having an inlet opening at one side thereof and an outlet opening at another side thereof, each part having a manifold for receiving said material;
   a pair of distributors removably received between the die body parts, one adjacent the manifold of one said part and the other adjacent the manifold of the other said part, said distributors also being adjacent each other and spaced apart to define a space therebetween intermediate said inlet opening and said outlet opening,
   and each said distributor having at least one peripheral flow channel in communication with the manifold adjacent thereto and extending from the manifold adjacent thereto to said space for directing said material from the adjacent manifold to said space;
   a wire guide removably mounted intermediate said inlet opening and said space and between said die parts, said guide having wire receiving grooves therein for receiving said wires and guiding them from said inlet opening to said space; and
   a die plate, having at least one opening therein, removably mounted between said distributors at the side of said space opposite from the side thereof at which said guide is mounted with said opening aligned with said groove in said guide.

2. A die assembly as set forth in claim 1 wherein the axes of the manifolds extend transversely to the direction of said grooves in said wire guide and wherein said distributors are cylindrical and have their axes parallel to each other and to the axes of said manifolds.

3. A die assembly as set forth in claims 1 or 2 further comprising adjustable screw means on said parts and extending into said flow channels for adjusting the flow of material therein.

4. A die assembly as set forth in claim 2 wherein said wire guide comprises two parts each having said grooves therein, said last-mentioned parts being in abutting relation so that the grooves from tubular passageways.

5. A die assembly as set forth in claim 4 wherein the portion of said wire guide adjacent said space abuts and conforms to the shape of said distributors.

6. A die assembly as set forth in claim 5 wherein the dimension of said space between the end of said wire guide nearest said die plate and said die plate is not greater than one-eighth inch whereby contact between said material and wires being covered prior to reaching said die plate is minimized.

7. A die assembly as set forth in claim 1 wherein each distributor has a plurality of peripheral flow channels less in number than the number of said grooves in said wire guide, each of the channels of one distributor overlying a plurality of said grooves and each of the channels of the other distributor underlying a corresponding plurality of said grooves.

8. A die assembly as set forth in claim 7 wherein said die plate has a plurality of openings therein less in number than the number of said grooves.

* * * * *

UNITED STATES PATENT AND TRADEMARK OFFICE
CERTIFICATE OF CORRECTION

PATENT NO. : 4,341,509
DATED : July 27, 1982
INVENTOR(S) : Norman R. Harlow

It is certified that error appears in the above-identified patent and that said Letters Patent are hereby corrected as shown below:

Column 6, claim 4, line 4, delete "from" and insert --form--.

Signed and Sealed this

Fourth Day of January 1983

[SEAL]

Attest:

Attesting Officer

GERALD J. MOSSINGHOFF

Commissioner of Patents and Trademarks